United States Patent [19]

Harbourne

[11] 4,010,237
[45] Mar. 1, 1977

[54] EXTRACTION OF NICKEL FROM NICKEL-BEARING ORES

[75] Inventor: David Alan Harbourne, Kingston, Canada

[73] Assignee: Du Pont of Canada Limited, Montreal, Canada

[22] Filed: May 10, 1976

[21] Appl. No.: 684,933

Related U.S. Application Data

[63] Continuation-in-part of Ser. No. 519,356, Oct. 30, 1974, abandoned.

[30] Foreign Application Priority Data

Nov. 7, 1973 Canada .............................. 185246

[52] U.S. Cl. .............................................. 423/150
[51] Int. Cl.$^2$ ........................................ C01G 53/00
[58] Field of Search ......... 423/150; 75/101 R, 119; 260/2 R

[56] References Cited

UNITED STATES PATENTS 3,475,163    8/1969    Watson et al. ................... 75/101 R

*Primary Examiner*—Oscar R. Vertiz
*Assistant Examiner*—Brian E. Hearn

[57] ABSTRACT

A process for the extraction of nickel values from a nickel oxide/silicate ore having a high magnesia/low iron oxide content, e.g. 15–50% magnesia and 0–20% iron oxide by contacting the ore with an aqueous polyalkylenehexamine solution in the presence of oxygen. The general formula for the polyalkylenehexamine is $NH_2(CH_2)_nNH(CH_2)_mNH(CH_2)_nNH(CH_2)_mNH(CH_2)_nNH_2$ where $n$ and $m$ are 2 or 3, $n$ and $m$ being the same or different. Preferably $n$ is 2 and $m$ is 3.

8 Claims, No Drawings

EXTRACTION OF NICKEL FROM NICKEL-BEARING ORES

CROSS REFERENCE TO RELATED APPLICATIONS

This application is a continuation-in-part of my copending Ser. No. 519,356, filed on Oct. 30, 1974, and entitled "Extraction of Nickel from Nickel-bearing Ores", now abandoned.

BACKGROUND OF THE INVENTION

This invention relates to the extraction of nickel from nickel-bearing ores and in particular to the selective extraction of nickel from nickel-bearing ores having a high magnesia/low iron oxide content in which the nickel is in the form of oxide and/or silicate salts.

Processes for the leaching of nickel oxide/silicate ores are known. Such ores may be subjected to a prereduction process followed by an ammonia leaching process, for example, using ammonia/ammonium carbonate solutions. In an ammonia leaching process, magnesium salts may contaminate the leaching solution and result in a scaling problem in subsequent steps in the process. The scaling problem is discussed in U.S. Pat. No. 3,644,114 of E. A. Vosahlova et al. which issued on Feb. 22, 1972. Acid leaching of ores having a high iron content is also known but application of an acid leaching process to a high magnesia ore may result in undesirable dissolution of magnesium. Nickel may also be extracted from nickel-bearing ores using pyrometallurgical processes.

The use of polyamine extraction processes is also known. J. D. Watson, Sr. et al. in Canadian Pat. No. 890,347 which issued Jan. 11, 1972, describe a process for the chemical extraction of nickel, copper, chromium and cobalt metal values from ores. The process comprises contacting the ore with an aqueous solution of a polyalkylene-polyamine or polyalkyleneimine, or mixtures thereof. One of the examples illustrates the selective extraction of cobalt and chromium from a low magnesia/high iron oxide ore containing nickel using an aqueous polyethylenehexamine solution.

It has now been found that nickel may be extracted from high magnesia/low iron oxide ore using an aqueous solution of polyalkylenehexamine.

SUMMARY OF THE INVENTION

An improvement in a process for the extraction of nickel values from a nickel oxide/silicate ore having a high magnesia/low iron oxide content and having a magnesia content measured as MgO greater than the iron content measured as $Fe_2O_3$, which comprises contacting the ore with an aqueous polyalkylenehexamine solution in the presence of oxygen, the polyalkylenehexamine having the formula $NH_2(CH_2)_nNH(CH_2)_mNH(CH_2)_nNH(CH_2)_mNH(CH_2)_nNH_2$ wherein $n$ and $m$ are 2 or 3, $n$ and $m$ being the same or different.

DESCRIPTION OF THE INVENTION

The ores that can be used in the process of the present invention are nickel oxide/silicate ores that have a high magnesia/low iron oxide content. Such ores have a magnesia content, measured as MgO on a weight basis, greater than the iron oxide content, measured as $Fe_2O_3$. The preferred range of magnesia is 15–50% by weight of the ore while the preferred range of iron oxide is 0–20% by weight of the ore. The ore can be ground to increase the surface area of the particles. Preferably at least 80% of the ore passes through a 28 Tyler mesh screen and more preferably through a 65 Tyler mesh screen. It may be preferred to concentrate the ore by known techniques prior to subjecting the ore to the process of the present invention. Suitable concentrating techniques include physical benefication techniques, for example, flotation and magnetic separation techniques. Ores so treated may be referred to as concentrates.

In the process of the invention, the ore is contacted with an aqueous solution of the polyalkylenehexamine for some hours. The actual period of time depends on the weight and type of polyalkylenehexamine in the solution, the amount of ore used, the fineness of the grind of ore, the temperature and pH of the solution, the nickel value of the ore and the degree of extraction desired, as is illustrated in the example hereinafter.

Agitation of the solution of ore in contact with the polyalkylenehexamine solution can affect the rate of extraction.

The concentration of polyalkylenehexamine can be varied over a wide range but since the rate of extraction depends at least in part on the concentration of polyalkylenehexamine used, relatively high concentrations may be preferred. The economics of the process must be considered at the higher concentration levels. The optimum ratio of polyalkylenehexamine to ore depends on the rate and degree of extraction desired and on the nickel value of the ore.

The temperature can be varied over a wide range, for example, from about 0° C to the boiling point of the aqueous solution. A preferred temperature range is about 60° to about 100° C.

Although the pH of the solution can be varied over a wide range, it is preferred that the process be operated in neutral or mildly acid or alkaline solutions and not in very acid or very alkaline solutions. The preferred pH range is from about 7 to about 12. The degree of the simultaneous extraction of magnesium may increase with decreasing pH.

In the polyalkylenehexamines that can be used in the process of the present invention it is preferred that the nitrogen atoms of the hexamine be separated by either two or three carbon atoms. Any substituents on the nitrogen or carbon atoms are preferably such that the substituents do not appreciably hinder access of nickel atoms to the nitrogen atoms. It is preferred that any substituents be electron-withdrawing substituents. A preferred hexamine is $NH_2(CH_2)_2NH(CH_2)_3NH(CH_2)_2NH(CH_2)_3NH(CH_2)_2NH_2$.

The process is operated in the presence of oxygen, for example, in the form of the pure gas or in the form of air. Operation of the process in the absence of air may be detrimental to the rate of extraction.

The following examples are presented to illustrate but not to restrict the present invention. Parts and percentages are by weight unless otherwise specified.

EXAMPLES 1–3

A sample of ore was ground. The portion passing through a 65 Tyler mesh screen was collected and contacted with an aqueous solution containing 2.6% of a hexamine having the formula $NH_2(CH_2)_2NH(CH_2)_3NH(CH_2)_2NH(CH_2)_3NH(CH_2)_2NH_2$. The mixture of ore and hexamine was agitated and maintained in an oxygen atmosphere at a temperature of 100° C for 115 hours. An ore outside the present invention was treated in a like manner for comparison. The results are given in Table I.

The analyses of the metal content of the ores used were obtained using atomic absorption techniques.

EXAMPLES 4–5

To demonstrate the effect of the type of amine used, the experimental procedure of Example 1 was repeated with a number of amines at various concentrations. The results are given in Table II.

EXAMPLES 6–7

The experimental procedure of Example I was carried out replacing the oxygen atmosphere with an alternate atmosphere. The results are given in Table III.

TABLE I

| Ex. | Ore Analysis (%) Ni | Fe | MgO | Ratio of Ore to Solution | Solution (pH) | Extraction (%Ni in Ore) |
|---|---|---|---|---|---|---|
| 1**ca | 0.2 | 2–5 | 34–35 | 2:50 | ca 11.6 | 27–49 |
| 2 | 1.4 | 8.6 | 31.4 | 2:50 | ca 11.6 | 14 |
| 3 | 1.8 | 8.6 | 28.4 | 2:50 | ca 11.6 | 5 |
| Comp. | 0.8 | 50 | 0.4 | 2:66* | ca 11.0 | 0.6 |

*0.41% hexamine solution
**summary of the results of 5 runs, the runs being carried out on 5 different ore samples having a Ni, Fe and MgO analysis in the range indicated.

TABLE II

| Ex. | Ore Analysis (%) Ni | Fe | MgO | Amine* | Amine Concen.** | Solution (pH) | Extraction (%Ni in Ore) |
|---|---|---|---|---|---|---|---|
| 4 | 0.22 | 5 | 39 | A | 1.48 | 11.6 | 42 |
| 5 | 0.22 | 5 | 39 | B | 1.49 | 11.6 | 39 |
| Comp. | 0.22 | 5 | 39 | C | 2.93 | 11.7 | 27 |
| " | 0.22 | 5 | 39 | D | 2.26 | 11.6 | 26 |
| " | 0.22 | 5 | 39 | E | 2.21 | 11.6 | 22 |
| " | 0.22 | 5 | 39 | F | 4.44 | 11.7 | 15 |

*A - hexamine $NH_2(CH_2)_2NH(CH_2)_3NH(CH_2)_2NH(CH_2)_3NH(CH_2)_2NH_2$
B - hexamine $NH_2(CH_2)_2NH(CH_2)_2NH(CH_2)_2NH(CH_2)_2NH(CH_2)_2NH_2$
*C - triamine $NH_2(CH_2)_2NH(CH_2)_2NH_2$
D - tetramine $NH_2(CH_2)_2NH(CH_2)_3NH(CH_2)_2NH_2$
E - tetramine $NH_2(CH_2)_2NH(CH_2)_2NH(CH_2)_2NH_2$
F - diamine $NH_2(CH_2)_2NH_2$
** moles amine/gm ore ($\times 10^2$)

TABLE III

| Ex. | Ore Analysis (%) Ni | Fe | MgO | pH | Atmosphere | Extraction (%Ni in Ore) |
|---|---|---|---|---|---|---|
| 6 | 0.22 | 5 | 41 | 11.6 | Oxygen | 43 |
| 7 | 0.22 | 5 | 41 | 11.6 | Air | 42 |
| Comp. | 0.22 | 5 | 41 | 11.6 | Nitrogen | 25 |

EXAMPLE 9

Two grams of a ground ore sample containing 0.25% nickel, 1.77% iron and 51.48% magnesia were leached with 50 ml of an aqueous solution containing 1.478 gm (2.83 × 10⁻³ moles/gm of ore) of the hexamine of Example 1. The solution had a pH of 11.2. The mixture of ore and hexamine was agitated and maintained in an air atmosphere at a temperature of 100° C. After 150 hours 26.5% of the nickel had been extracted from the ore.

EXAMPLE 10

The procedure of Example 9 was repeated using a solution having a pH of 7.05 which pH was obtained by adding hydrochloric acid to the mixture. After 150 hours 31.3% of the nickel has been extracted from the ore.

I claim:

1. In a process for the extraction of nickel values from a nickel oxide/silicate ore having a magnesia content measured as MgO greater than the iron content measured as $Fe_2O_3$, the improvement which comprises contacting the ore in the presence of oxygen with an aqueous solution of a polyalkylenehexamine having a pH in the range from about 7 to about 12, said amine having the formula $NH_2(CH_2)_nNH(CH_2)_mNH(CH_2)_nNH(CH_2)_mNH(CH_2)_nNH_2$ wherein $n$ and $m$ are 2 or 3, $n$ and $m$ being the same or different.

2. The process of claim 1 in which the ore is ground prior to contacting the ore with the aqueous solution of a polyalkylenehexamine.

3. The process of claim 2 in which the ore contains 15–50% magnesia and 0–20% iron oxide.

4. The process of claim 3 in which the temperature of the aqueous solution is in the range 60° to 100° C.

5. The process of claim 4 in which the polyalkylenehexamine is $NH_2(CH_2)_2NH(CH_2)_3NH(CH_2)_2NH(CH_2)_3NH(CH_2)_2NH_2$.

6. The process of claim 1 in which the ore is contacted with aqueous polyalkylenehexamine solution in the presence of air.

7. The process of claim 1 in which the ore is a concentrate.

8. The process of claim 7 in which the polyalkylenehexamine is $NH_2(CH_2)_2NH(CH_2)_3NH(CH_2)_2NH(CH_2)_3NH(CH_2)_2NH_2$ and in which the ore is contacted with the aqueous polyalkylenehexamine solution in the presence of air.

* * * * *